(12) United States Patent
Mohajeri

(10) Patent No.: US 8,718,607 B2
(45) Date of Patent: May 6, 2014

(54) ANONYMOUS CUSTOMER REFERENCE SERVICES ENABLER

(75) Inventor: Shahram Mohajeri, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/445,714

(22) Filed: Apr. 12, 2012

(65) Prior Publication Data

US 2013/0273886 A1    Oct. 17, 2013

(51) Int. Cl.
*H04M 1/66* (2006.01)

(52) U.S. Cl.
USPC ......... 455/411; 455/410; 455/414.1; 455/415

(58) Field of Classification Search
USPC ........ 455/411, 410, 414.1, 414.3, 418; 726/3, 726/5, 22, 26, 27
See application file for complete search history.

(56) References Cited

U.S. PATENT DOCUMENTS

| | | | |
|---|---|---|---|
| 7,092,367 B2 | 8/2006 | Kawai et al. | |
| 2009/0106413 A1* | 4/2009 | Salo et al. | 709/224 |
| 2009/0174551 A1* | 7/2009 | Quinn et al. | 340/540 |
| 2009/0217351 A1* | 8/2009 | Burch et al. | 726/3 |

OTHER PUBLICATIONS

'Proxy Blind—Staying Anonymous in the Age of Surveillance', www.proxyblind.org, last accessed Jul. 5, 2012.
'Proxy Server Privacy', www.proxyserverprivacy.com, last accessed Jul. 5, 2012.
'Find IP Address', http://www.find-ip-address.org/hide-my-ip.php, last accessed Jul. 5, 2012.
'How do I hide my IP address', http://whatismyipaddress.com/hide-ip, last accessed Jul. 5, 2012.

* cited by examiner

*Primary Examiner* — Kathy Wang-Hurst

(74) *Attorney, Agent, or Firm* — Amin, Turocy & Watson, LLP

(57) ABSTRACT

A system and methodology that facilitates generation and management of variable subscriber identifiers (V-SubIds) for protecting subscriber privacy is disclosed herein. In one aspect, an Anonymous Customer Reference Services (ACRS) component generates a V-SubId, which is a short-lived subscriber identifier that is inserted in a request received from a user equipment during request enrichment. Moreover, a different V-SubId can be inserted in subsequent request from the user equipment and thus, cross-site behavior tracking can be mitigated. In one aspect, the V-SubId can be exchanged for a subscriber identifier (SubId) associated with the user equipment, upon query by trusted systems/applications. Further, the V-SubId can be exchanged for a site-specific Anonymous Customer Reference (ACR) upon query by untrusted systems/applications, if user authorization is received. Moreover, the life cycle of the ACR is managed by the ACRS component, based on subscriber input.

25 Claims, 12 Drawing Sheets

ANONYMOUS CUSTOMER REFERENCE SERVICES ENABLER

CROSS REFERENCE TO RELATED APPLICATIONS

This application is related to co-pending U.S. patent application Ser. No. 13/482,962, filed on May 29, 2012, entitled "ANONYMOUS CUSTOMER REFERENCE CLIENT," and co-pending U.S. patent application Ser. No. 13/594,161, filed on Aug. 24, 2012, entitled "ALGORITHM-BASED ANONYMOUS CUSTOMER REFERENCES." The entireties of each of the foregoing applications are incorporated herein by reference.

TECHNICAL FIELD

The subject disclosure relates to wireless communications and, more particularly, to an anonymous customer reference services enabler.

BACKGROUND

Communication devices are seeing an explosive growth in application (app) development and utilization. The applications, or 'apps', can be pre-installed on the communication device by a manufacturer and/or downloaded by subscribers, for example, via an over-the-air (OTA) communication from a software distribution platform. By way of brief background, app developers can create custom applications by utilizing a unique identifier (ID) specific to a communication device. With communication devices and apps proliferating, protecting user privacy with respect to profiling and/or tracking a subscriber's behavior across apps and/or websites is of continued importance.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can mitigate user activity tracking and/or profiling by unauthorized entities (e.g., websites, systems, etc.), by utilization of variable subscriber identifiers (V-SubIds) during request enrichment. In one aspect, the disclosed subject matter relates to a system comprising at least one memory that stores computer-executable instructions and at least one processor, communicatively coupled to the at least one memory, that facilitates execution of the computer-executable instructions. Moreover, the computer-executable instructions on execution perform an authentication of a user equipment to allow the user equipment to connect with a telecommunications network, wherein the authentication employing a static identifier associated with the user equipment. Further, the computer-executable instructions on execution receive in the telecommunications network, from the user equipment, a request for an operation to be performed by an untrusted entity accessible via the telecommunications network. Additionally, the computer-executable instructions, on execution, based on the authentication, assign a variable subscriber identifier to the static identifier associated with the user equipment, insert the variable subscriber identifier into the request, and facilitate transmission of the request including the inserted variable subscriber identifier to the untrusted entity.

Another aspect of the disclosed subject matter relates to a method that includes receiving, by a system comprising at least one processor, a query for a variable subscriber identifier that is to be inserted into a request from a user equipment, the request being directed to an untrusted entity. Further, the method includes identifying, by the system, a static identifier associated with the user equipment based in part on an authorization of the user equipment with a telecommunications network, automatically generating, by the system, the variable subscriber identifier, and assigning, by the system, the variable subscriber identifier to the static identifier. Yet another aspect of the disclosed subject matter relates to a computer-readable storage medium comprising computer-executable instructions that, in response to execution, cause a system, including at least one processor, to perform operations including determining that a request received at a telecommunications network from a user equipment is directed to an untrusted entity accessible via the telecommunications network based on analyzing the request, the request being for an operation to be performed by the untrusted entity, identifying a static identifier associated with the user equipment based in part on an authorization of the user equipment with the telecommunications network, and obtaining a variable subscriber identifier assigned to the static identifier associated with the user equipment. In addition, the operations include inserting the variable subscriber identifier into the request and directing the request with the variable subscriber identifier thus inserted to the untrusted entity.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
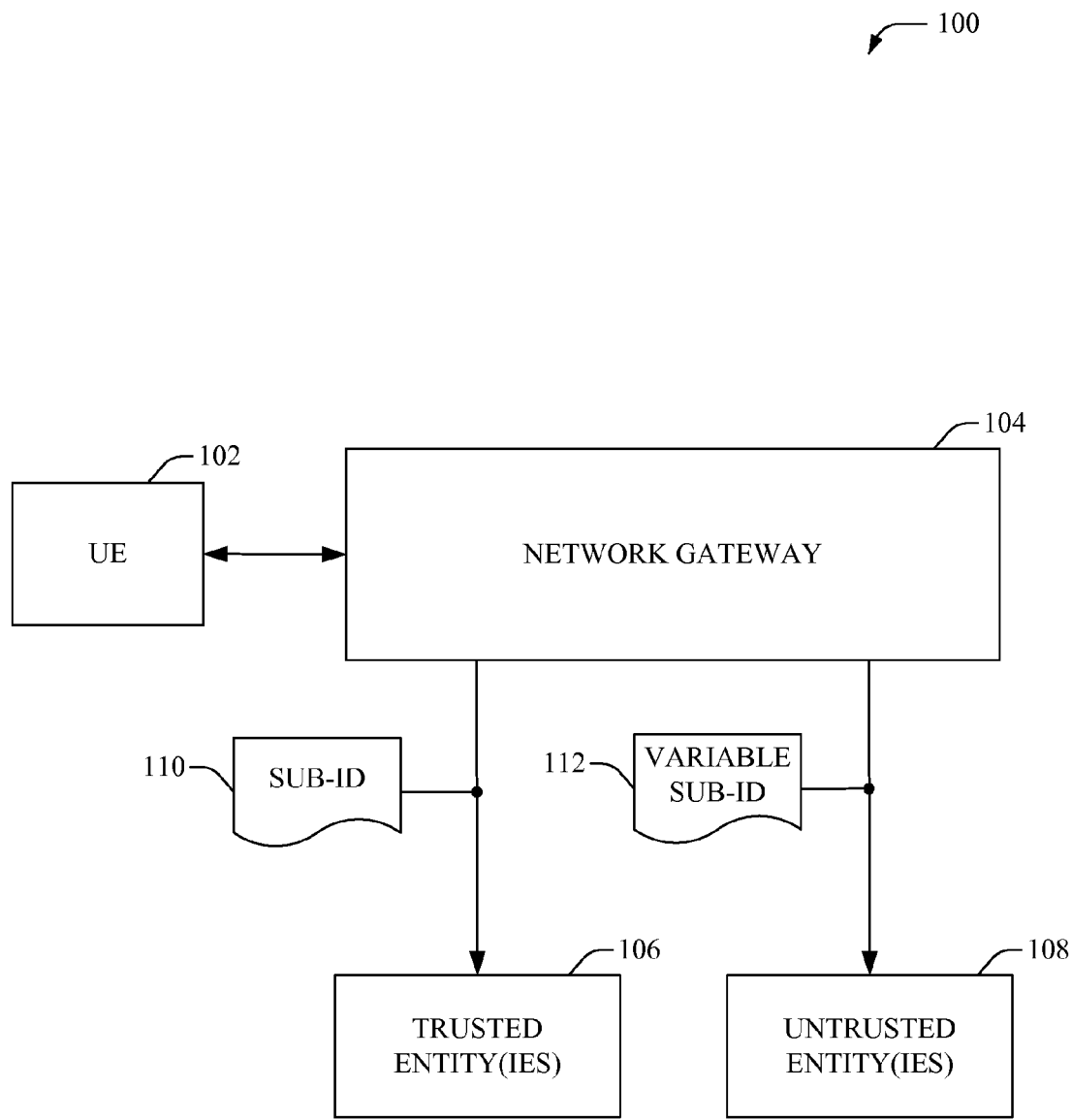
FIG. 1 illustrates an example system that facilitates utilization of a variable subscriber identifier (V-SubId) to protect user privacy.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," "platform," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Application (app) developers and other potentially non-trusted entities can monitor and/or track communication device users through a unique identifier (ID) (e.g., subscriber identifier SubId) related to a subscriber of the communication device, creating privacy problems for the users. The systems and methods disclosed herein facilitate generation and utilization of a variable subscriber ID (V-SubId) to prevent profiling and/or subscriber-behavior tracking by unauthorized applications/entities. In one aspect, the V-SubId masks the subscriber's identity (e.g., the unique SubId) from selected unauthorized websites, which are accessed by the subscribers and accordingly protects subscriber privacy.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX (technology. Additionally, substantially all aspects of the disclosed subject matter can be exploited in legacy (e.g., wireline) telecommunication technologies.

Referring initially to FIG. 1, there illustrated is an example system 100 that facilitates utilization of a V-SubId to protect user privacy, according to one or more aspects of the disclosed subject matter. System 100 can utilize SIM and/or SIM-based authentication assets to differentiate between trusted and untrusted networks and/or services. Moreover, system 100 can be utilized to mask or replace a unique ID associated with a user equipment (UE) 102 during communication between the UE 102 and one or more systems/services. Typically, UE 102 can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, UE 102 can also include, for example, LTE-based devices, such as, but not limited to, most any home or commercial appliance that includes an LTE radio. It can be noted that UE 102 can be mobile, have limited mobility and/or be stationary. Typically, the subscriber of the UE 102 is assigned a unique and constant subscriber identifier (SubId), for example, that is associated with the subscriber identity module (SIM) and/or subscriber account associated with the UE 102. In one example, the SubId is independent of a Mobile Station International Subscriber Directory Number (MSISDN) and SIM of the UE 102, and does not change if the MSISDN is modified and/or SIM is replaced.

In one embodiment, system 100 can include a network gateway 104, for example, deployed within a core mobility network (e.g., cellular network), that facilitates routing of a request(s) received from UE 102. As an example, the network gateway 104 can include, but is not limited to, a proxy server (e.g., a Hypertext Transfer Protocol (HTTP) proxy server), a next generation gateway (NGG), and/or a multi service proxy (MSP). Moreover, the UE 102 can be coupled to the network gateway 104 via one or more radio access network(s) and/or network elements (not shown) of the mobility network. In one aspect, the UE 102, for example, on power-on or on entering a coverage area of the mobility network, can perform a SIM authentication with the mobility network (e.g., via handshaking with a home location register (HLR)) to authorize the UE 102 to communicate via the mobility network. By way of example, on authentication, a network support node, for example, Gateway GPRS Support Node (GGSN), can assign an Internet protocol (IP) address to the UE 102, identify a device number, such as, but not limited to, a MSISDN associated with the UE 102 (e.g., from the HLR), and propagate the IP address and corresponding MSISDN to downstream network elements such as the network gateway 104. Moreover, when a request from UE 102 is received, the network gateway 104 can detect an IP address from the request, and accordingly determine the corresponding MSISDN associated with the IP address. Moreover, the request as disclosed herein can include most any communication message delivered from the UE 102 to a network server (e.g., a web server, an application server, an email server, etc.). In one example, the request can include (but is not limited to) a request for information/data from the network server. In another example, the request can also include (but is not limited to) an instruction and/or command for requesting the network server to perform a specific action (e.g., load a new web page, refresh a web page, delete an email, etc.). In yet another example, the request can include a HTTP request (e.g., a GET request, a PUT request, a DELETE request, etc.). However, it is noted that the subject disclosure is not limited to HTTP requests, and that the UE 102 can transmit requests utilizing most any communication protocol, for example (but not limited to), Secure-HTTP (S-HTTP), HTTP Secure (HTTPS), SPDY® protocol, Waka protocol, a proprietary protocol, etc. Moreover, if the UE 102 utilizes a secure protocol such as (but not limited to) S-HTTP and/or HTTPS, a network server (not shown) can perform a HTTP Redirect (302) onto an endpoint within the server served by HTTP such that the network gateway 104 can enrich the request with V-SubId/SubId. Further, although mobility and/or cellular networks are described herein, it is noted that the network gateway 104 can reside within most any communication network (e.g., wired or wireless) that facilitates authentication with UE 102 based on a unique ID/credential associated with the UE 102 and/or subscriber of the UE 102, prior to the UE 102 connecting to and/or accessing the communication network.

In one aspect, the network gateway 104 can employ a SubId enrichment policy, wherein on receiving a request (communication and/or data packet) from UE 102, the network gateway 104 identifies a SubId 110 associated with the MSISDN of the UE 102 and enriches a header of the request with the SubId data, based in part on the destination of the request. Typically, the SubId 110 is a unique and unchangeable identifier associated with a subscriber of UE 102. In particular, the network gateway 104 can determine whether the destination of the request is a trusted entity(ies) 106 (e.g., an entity authorized to access the SubId) or an untrusted entity(ies) 108 (e.g., an entity that is not authorized to access the SubId), for example, based on a destination uniform resource locator (URL) within the request. In one example, if the network gateway 104 determines that the destination of the request is a trusted entity 106, the header of the request can be updated with the SubId 110 associated with UE 102, and the updated request can be forwarded to the trusted entity 106. As an example, the trusted entity 106 can utilize the SubId 110 to enable consistent data services and/or a seamless service experience across data sessions for the UE 102 (e.g., one-click payment taking advantage of implicit authentication already done as part of the device's logging-on and/or connecting to the mobile network).

Alternatively, if the network gateway 104 determines that the destination of the request is an untrusted entity 108, the header of the request is updated with a V-SubId 112. The updated request can then be forwarded to the untrusted entity 108. As an example, the V-SubId 112 can change with time (e.g., periodically, on demand, based on an event/schedule, etc.), and/or across data sessions, such that the untrusted entity 108 cannot track and/or profile subscriber activity. Moreover, the V-SubId 112 can be randomly generated, unique, opaque, and/or can be repeated and/or reused. Accordingly, the V-SubId 112, due to its changing nature, can prevent traceability of the subscriber by the untrusted entity 108, while allowing a network service provider to uniquely identify the subscriber associated with the V-SubId, if the need arises (e.g., for law enforcement).

Figure 2:
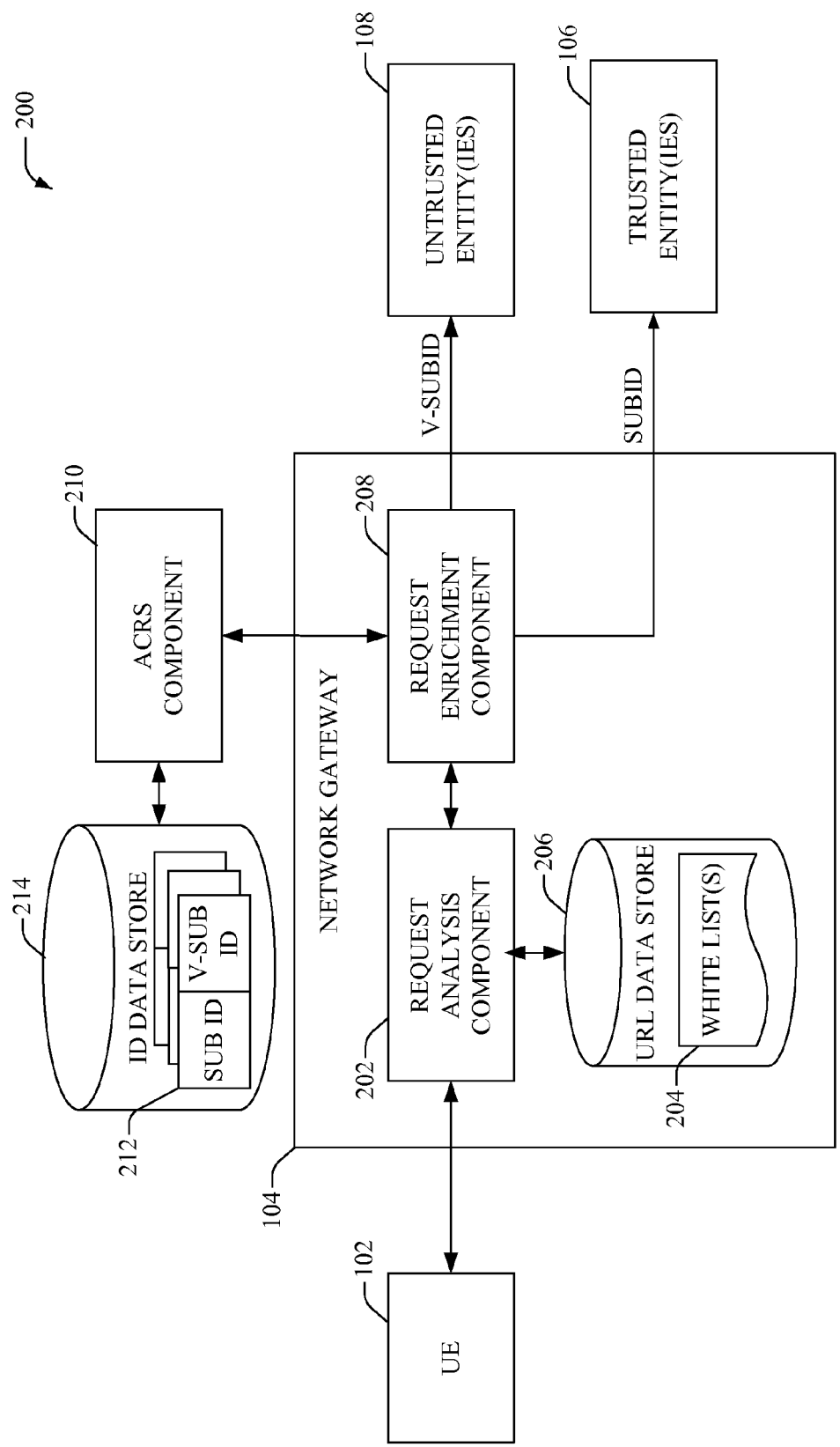
FIG. 2 illustrates an example system that facilitates generation and transmission of V-SubIds over a mobility network.

Referring now to FIG. 2, there illustrated is an example system 200 that facilitates generation and transmission of V-SubIds over a mobility network, in accordance with an aspect of the subject disclosure. To mitigate the risk of undesired subscriber-behavior tracking by unauthorized systems, system 200 facilitates V-SubId insertion in a data packet in place of a unique SubId insertion, in response to the data packet being directed to the unauthorized systems. It is noted that the UE 102, network gateway 104, trusted entity(ies) 106, and untrusted entity(ies) 108 can include functionality as more fully described herein, for example, as described above with regard to system 100.

In one embodiment, the network gateway 104 can include a request analysis component 202 that can determine whether a request, received from UE 102, is to be enriched with a V-SubId or a unique SubId (e.g., a SubId that is constant/static). The request analysis component 202 can receive the request from the UE 102 and can analyze at least a portion of the request, for example, a header (e.g., HTTP header) associated with the request. In one example, the request analysis component 202 can, based on the analysis, identify a destination URL to which the request is directed. Further, the request analysis component 202 can compare the destination URL with a set of authorized and/or trusted URLs stored in whitelist(s) 204 that is retained in a URL data store 206. By way of example, whitelist(s) 204 can include a set of URLs associated with trusted websites, systems, content providers, service providers, etc. In an aspect, the whitelist(s) 204 can typically be created, updated, and/or managed by a network operator associated with the network service provider. Further, the request analysis component 202 can determine an IP address of the UE 102 (e.g., based on the analysis of the request) and can identify a corresponding device ID (e.g., MSISDN) of the UE 102.

Moreover, if the request analysis component 202 identifies that the destination URL is within the whitelist(s) 204, then a request enrichment component 208 can map the device ID (e.g., MSISDN) to a unique SubId associated with the subscriber (e.g., via a database lookup) and insert the SubId within the request (e.g., within the header of the request). Further, the request enrichment component 208 can forward the enriched/updated request to a trusted entity 106 associated with the destination URL. Alternatively, if the request analysis component 202 identifies that the destination URL is not within the whitelist(s) 204, then the request enrichment component 208 can determine a V-SubId for the request. According to an embodiment, the request enrichment component 208 can access an anonymous customer reference services (ACRS) component 210 to receive the V-SubId. Moreover, the ACRS component 210 can facilitate generation and management of V-SubIds. Further, the ACRS component 210 can provide a SIM-based Identity (e.g., based on a SIM-based authentication performed as part of the UE 102's connecting to the mobility network) to external systems and application developers. As an example, the V-SubId can include most any random, opaque, unique (for a specific time and/or session), number or code that can change based on an event/criterion, such as (but not limited to) expiration of a timer, termination of a data session, etc. In an aspect, the ACRS component 210 can generate the V-SubId by employing most any random number generator that can create the V-SubId based on, or independent of, the SubId, MSISDN, device ID, etc. For example, the ACRS component 210 can utilize a 32-digit long random number or an MD5 hash of a random number.

Further, the ACRS component 210 can store (e.g., temporarily or permanently) the V-SubId in one or more tables 212, retained within ID data store 214. As an example, a one-to-one mapping can typically exist between the V-SubId and the SubId associated with the UE 102 such that a SubId query based on the V-SubId can be performed (e.g., by service provider partner systems, law enforcement systems, etc.) and the SubId corresponding to the queried V-SubId be retrieved. In one aspect, the ACRS component 210 can determine when the subscriber's data session has ended or a timer associated with the V-SubId has expired, and can remove and/or modify the V-SubId from the one or more tables 212. As an example, transaction logs associated with creation and/or modification of records (e.g., including the V-SubId) within the one or more tables 212 can be saved (e.g., by the ACRS component 210), such that, a subscriber's transaction can be identified at a later time (e.g., for law-enforcement purposes).

In one aspect, on receiving a request for a V-SubId from the request enrichment component 208, the ACRS component 210 can perform a table lookup to determine if the subscriber for the destination URL has a previously generated valid and/or non-expired V-SubId stored in the one or more tables 212. If a valid and/or non-expired V-SubId exists for the subscriber, the existing V-SubId can be returned to the request enrichment component 208 by the ACRS component 210. In contrast, if valid and/or non-expired V-SubId does not exist for the subscriber, the ACRS component 210 can generate a new V-SubId and return the new V-SubId to the request enrichment component 208. In one aspect, the request enrichment component 208 can insert the V-SubId within the request (e.g., within the header) and forward the enriched/updated request to an untrusted entity 108 associated with the destination URL. Additionally or optionally, the V-SubId can be stored at the network gateway 104 for a specific period (e.g., 24 hours) to avoid and/or mitigate communication between the request enrichment component 208 and the ACRS component 210. In one aspect, to further increase efficiency, the request enrichment component 208 can utilize the same V-SubId (while not expired) across all untrusted entities 108 for a specific time.

Accordingly, system 200 facilitates delivery of SubIds to the trusted entity(ies) 106 and delivery of V-SubIds to the untrusted entity(ies) 108. Although only whitelist(s) 204 are depicted and described herein, it is noted that the URL data store 206 can also include blacklist(s) that specify URL(s) of untrusted entity(ies) 108, to which a V-SubId (and not a SubId) is to be transmitted. Further, it is noted that the URL data store 206 and the ID data store 214 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Figure 3:
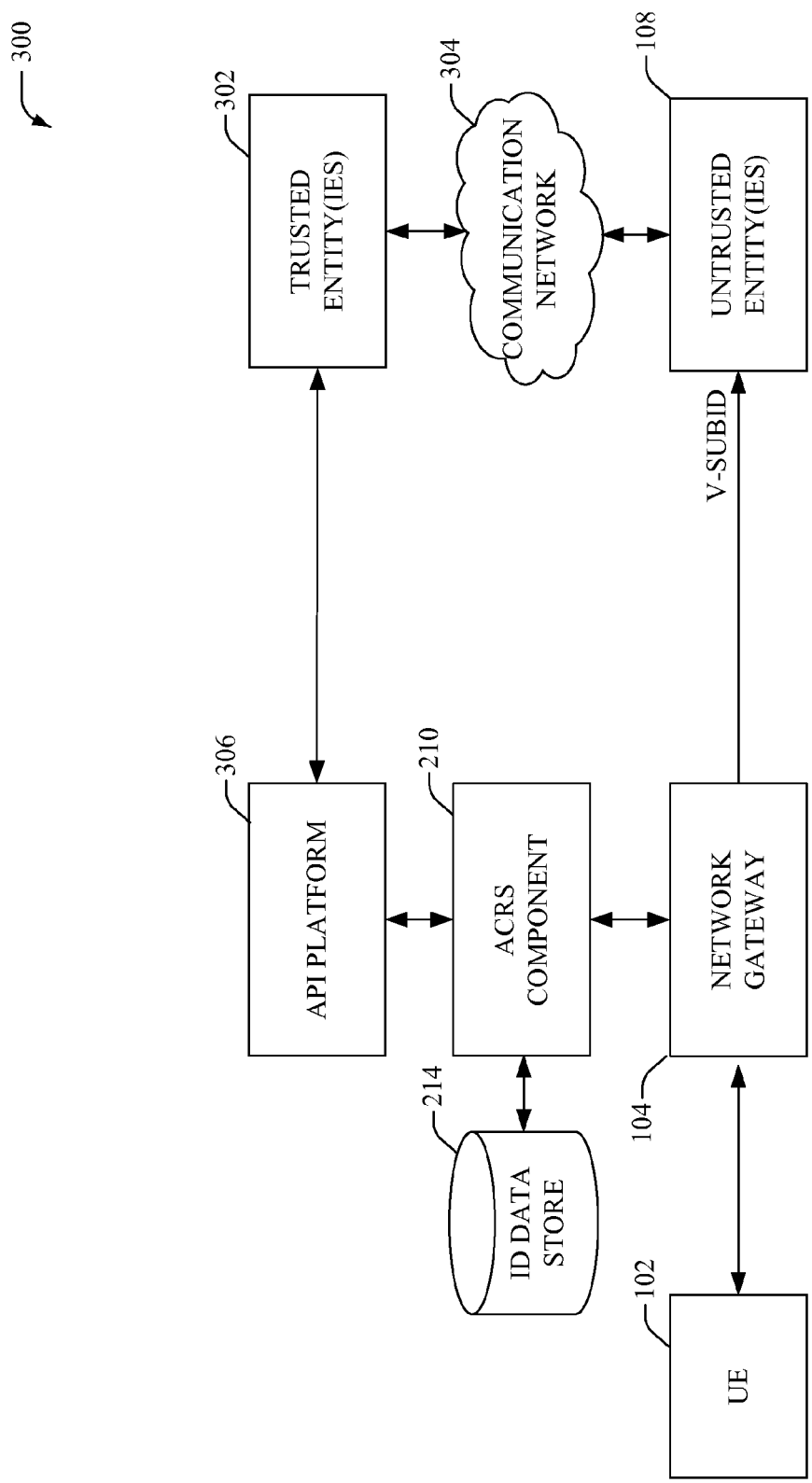
FIG. 3 illustrates an example system that facilitates a reverse lookup for a subscriber identifier (SubId) by a trusted entity.

Referring now to FIG. 3, there illustrated is an example system 300 that facilitates a reverse lookup for a SubId by a trusted entity, according to an aspect of the subject disclosure. Typically, system 300 can be utilized for providing an ID associated with a subscriber (e.g., static or dynamic), to one or more websites, systems, platforms, etc. to facilitate communication with UE 102. It is noted that the UE 102, network gateway 104, untrusted entity(ies) 108, ACRS component 210, and ID data store 214, can include functionality as more fully described herein, for example, as described above with regard to systems 100 and 200. System 300 can include a trusted entity(ies) 302, such as, but not limited to a trusted website, system, network, platform, server, etc., which can be authorized (e.g., by the user and/or service provider) to receive and/or utilize a SubId associated with the subscriber, for example, for value added services. Moreover, the trusted entity(ies) 302 can be substantially similar to trusted entity(ies) 106 and can include functionality as more fully described herein, for example, as described above with regard to trusted entity(ies) 106.

In one aspect, the UE 102 can access the trusted entity(ies) 302 via the untrusted entity(ies) 108. For example, a trusted website can be accessed by the UE 102 from a link on an untrusted website. As described herein, the network gateway 104 provides a V-SubId to the untrusted entity(ies) 108, during communication between the UE 102 and the untrusted entity(ies) 108. As an example, the V-SubId is inserted within a request from the UE 102 to the untrusted entity(ies) 108, for example, within a header (e.g., HTTP header) in the request and/or the body of the request. In another example, the V-SubId can be appended to the header and/or body of the request. The V-SubId can be transmitted through a communication network 304, for example, via one or more websites/servers/systems, to the trusted entity(ies) 302. Based on an analysis of the request, the trusted entity(ies) 302 can detect that the received ID (e.g., within a header of a request) is a V-SubId. For example, V-SubIds can have a specific configuration and/or syntax, such as, but not limited to a predefined code within the first/last N digits/characters (wherein N can be most any positive integer), which can be identified by the trusted entity(ies) 302 to verify that the received ID is a V-SubId.

According to an embodiment, the trusted entity(ies) 302 can exchange the V-SubId for a SubId associated with the subscriber via an application programming interface (API)

platform 306. As an example, the API platform 306 can receive the V-SubId from the trusted entity(ies) 302, verify that the trusted entity(ies) 302 is authorized to receive the SubId (e.g., based on a URL associated with the trusted entity(ies) 302), and query the ACRS component 210 for the SubId on successful verification. In one aspect, the ACRS component 210 can perform a reverse lookup to retrieve a SubId corresponding to the V-SubId, from the ID data store 214. As an example, the API platform 306 can provide an appropriate interface (e.g., Representational state transfer (RESTful) interface, Simple Object Access Protocol (SOAP) interface, etc.) to facilitate communication between the trusted entity(ies) 302 and the ACRS component 210. Additionally or alternatively, the trusted entity(ies) 302 can determine and/or generate the SubId based on a decoding technique/algorithm applied to the V-SubId in response to the V-SubId being generated based on applying a coding technique/algorithm to the SubId. For example, the V-SubId can be generated based on a hash/signature of the SubId and the trusted entity(ies) 302 can identify the SubId by applying an inverse hash/signature algorithm to the V-SubId.

As an example, the trusted entity(ies) 302 can utilize the SubId to apply user preferences and/or enable consistent data services and provide a seamless service experience across data sessions. Accordingly, system 300 can enrich a header (e.g., HTTP header) with a V-SubId that cannot be utilized by untrusted entities 108 for subscriber profiling, and can provide an API platform 306 that enables the trusted entity(ies) 302 to securely retrieve the SubId using the V-SubId. Although it is depicted in FIG. 3 as residing outside the ACRS component 210, the ID data store 214 also can reside (e.g., completely or partially) within the ACRS component 210 and/or be locally or remotely coupled to the ACRS component 210.

Figure 4:
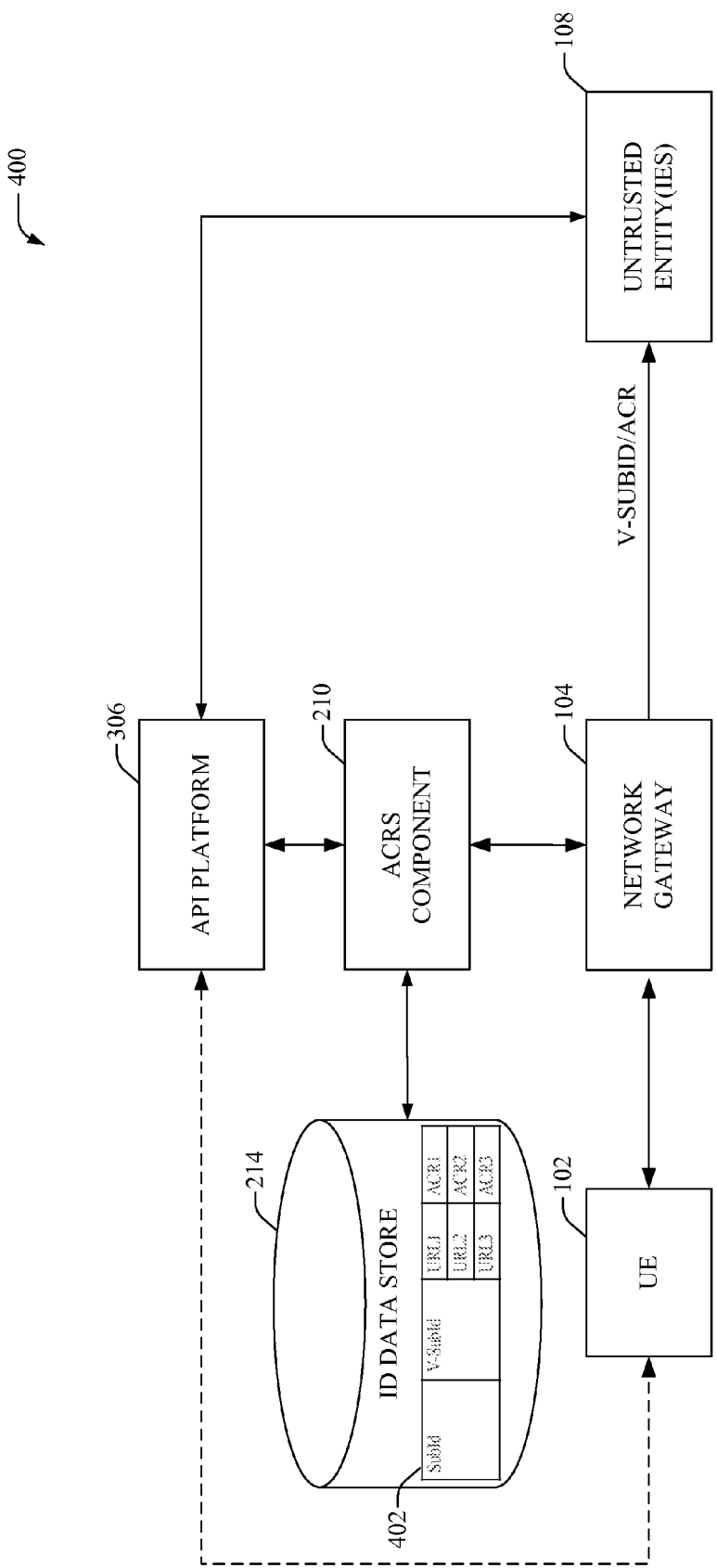
FIG. 4 illustrates an example system that facilitates generation and management of an anonymous customer reference (ACR).

FIG. 4 illustrates an example system 400 that facilitates generation and management of an anonymous customer reference (ACR) according to an aspect of the disclosed subject matter. Typically, system 400 can facilitate exchange of a V-SubId for a site-specific ACR based on a subscriber's authorization. Moreover, the system 400 enables a user to specify and/or authorize a site to receive a static (non-changing) ID for a specific time period. The UE 102, network gateway 104, untrusted entity(ies) 108, ACRS component 210, ID data store 214, and API platform 306 can include functionality as more fully described herein, for example, as described above with regard to systems 100-300.

In one aspect, the API platform 306 provides an interface for the untrusted entity(ies) 108 to make a request for an ACR based on user authorization. Moreover, the ACRS component 210 can generate ACRs and manage ACR lifecycles. As an example, the ACR can include most any random number that can be based on or independent of a SubId. Typically, the ACR can be specific to a particular website or set of websites and/or can be static for a specified time period. On receiving a request to generate an ACR for a specific untrusted entity(ies) 108, the API platform 306, can facilitate authorization (e.g., depicted as a dotted line in FIG. 4) with the UE 102 to receive subscriber consent and/or approval. As an example, the authorization can include (but is not limited to) an OAuth-flow that is used to ensure subscriber's authorization for the ACR request by the untrusted entity(ies) 108. OAuth is a security protocol that is developed by the Internet Engineering Task Force (IETF) OAuth Working Group and is defined by Hammer et al., "The OAuth 2.0 Authorization Protocol draft-ietf-oauth-v2-23," Jan. 21, 2012, which is incorporated by reference herein. It is noted that the subject disclosure is not limited to the OAuth protocol, and most any communication protocol can be utilized for authorization. On receiving subscriber authorization, API platform 306 can request the ACRS component 210 to generate the ACR and transmit the ACR (e.g., through API Platform 306) to the untrusted entity(ies) 108. In addition, the ACRS component 210 can generate and store the ACR in a table 402 within the ID data store 214. Moreover, if user authorization is not received, the API Platform 306 will not forward the ACR request from the untrusted entity(ies) 108 to the ACRS component 210.

While the ACR is active for a given URL, the ACRS component 210 can provide the ACR to the network gateway 104, for enrichment of subsequent requests to the untrusted entity(ies) 108 from the UE 102. As an example, the expiration time associated with the ACR can be specified by the user during authorization and/or can be set to a code (e.g., "999") that indicates that the ACR will not expire unless explicitly requested by the subscriber and/or the untrusted entity(ies) 108. Further, the untrusted entity(ies) 108 and/or subscriber (via UE 102) can request an ACR cancellation through API platform 306. As an example, OAuth-flow can be employed to ensure subscriber's authorization for the ACR cancellation, if requested by the untrusted entity(ies) 108 (e.g., the same OAuth token that was utilized to create the ACR can be reused to cancel the ACR). Moreover, on receiving the ACR cancellation request (e.g., authorized by the subscriber), the ACRS component 210 can remove the ACR from the table 402 and notify the network gateway 104 of the cancelled ACR.

According to one aspect, the ACR can include a predefined code, for example, within the first/last N digits/characters (wherein N can include most any positive integer), which can be identified by a trusted entity (e.g. trusted entity(ies) 302), accessed via untrusted entity(ies) 108, to verify that the received ID is an ACR. Moreover, as with the V-SubId, the trusted entity can exchange the ACR for a SubId associated with the subscriber via the API platform 306. In one example, the API platform 306 can receive the ACR from the trusted entity, determine that the trusted entity is authorized to receive the SubId (e.g., based on a URL associated with the trusted entity), and query the ACRS component 210 for the SubId on successful verification. In one aspect, the ACRS component 210 can perform a reverse lookup to retrieve a SubId corresponding to the ACR, from the ID data store 214.

Figure 5:
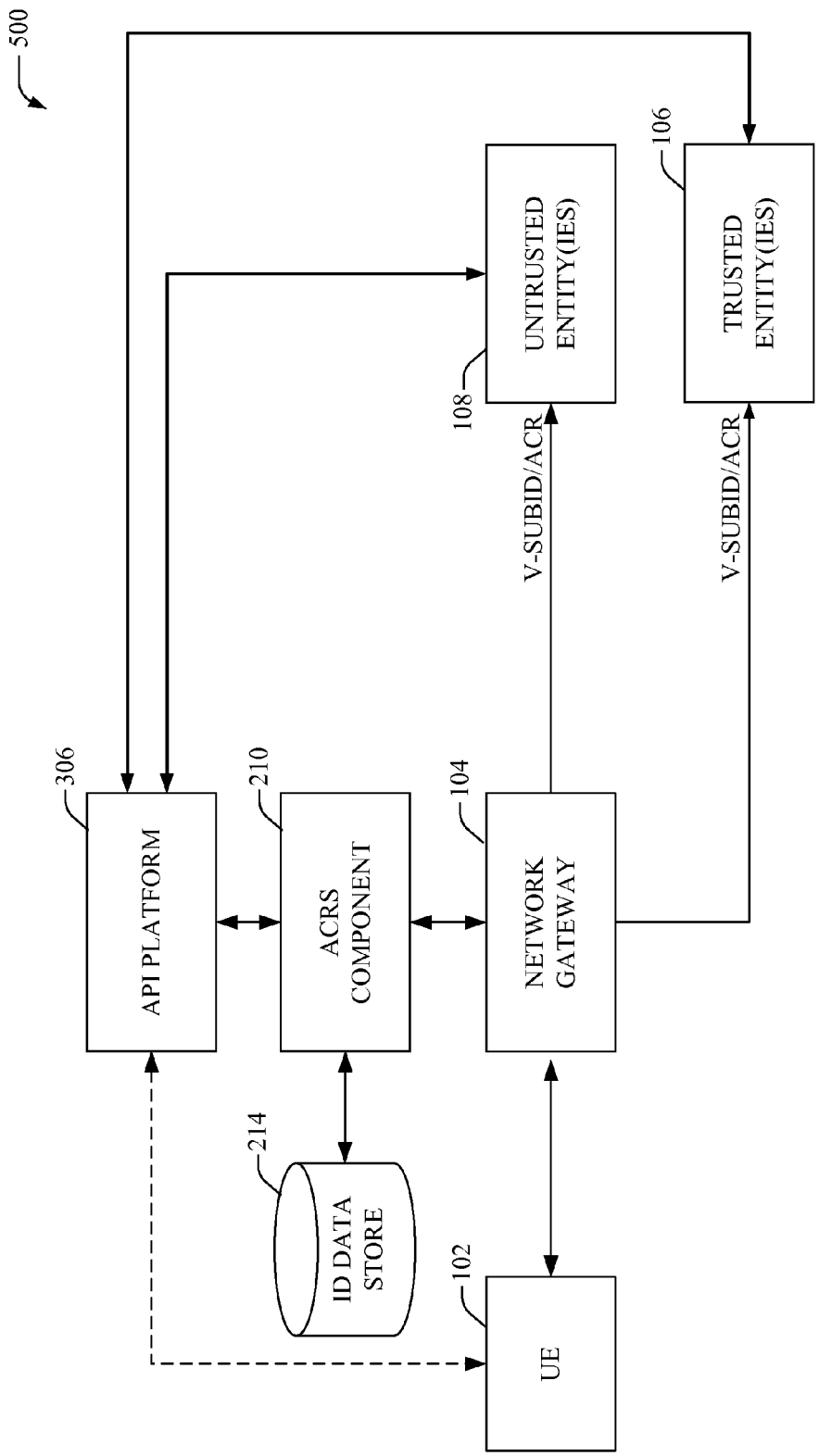
FIG. 5 illustrates an example system that utilizes SIM-based authentication to provide site-specific ACRs.

Referring now to FIG. 5, there illustrated is an example system 500 that utilizes SIM-based authentication to provide site-specific ACRs, according to an aspect of the disclosed subject matter. Typically, the UE 102, network gateway 104, trusted entity(ies) 106, untrusted entity(ies) 108, ACRS component 210, ID data store 214, and API platform 306, can include functionality as more fully described herein, for example, as described above with regard to systems 100-400.

In this embodiment, initially the network gateway 104 provides a V-SubId (e.g., in a request header) to both trusted entity(ies) 106 and untrusted entity(ies) 108. As described herein with respect to system 400, the untrusted entity(ies) 108 can request an ACR via API platform 306. In one aspect, the trusted entity(ies) 106 of system 500 can also request an ACR via the API platform 306. Moreover, the API platform 306 can receive user authorization, prior to the ACRS component 210 generating ACRs for the trusted entity(ies) 106 and/or untrusted entity(ies) 108. On receiving user approval, the ACRS component 210 can create and/or store respective ACRs for the trusted entity(ies) 106 and untrusted entity(ies) 108. In one example, the ACRs can be utilized by the network gateway 104 for subsequent requests from the UE 102 that are directed to the trusted entity(ies) 106 and/or untrusted entity(ies) 108, for example, until deleted and/or cancelled by the subscriber and/or the entity (e.g., the trusted entity(ies) 106 and/or untrusted entity(ies) 108).

FIGS. 6-9 illustrate flow diagrams and/or methods in accordance with the disclosed subject matter. For simplicity of explanation, the flow diagrams and/or methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 6:
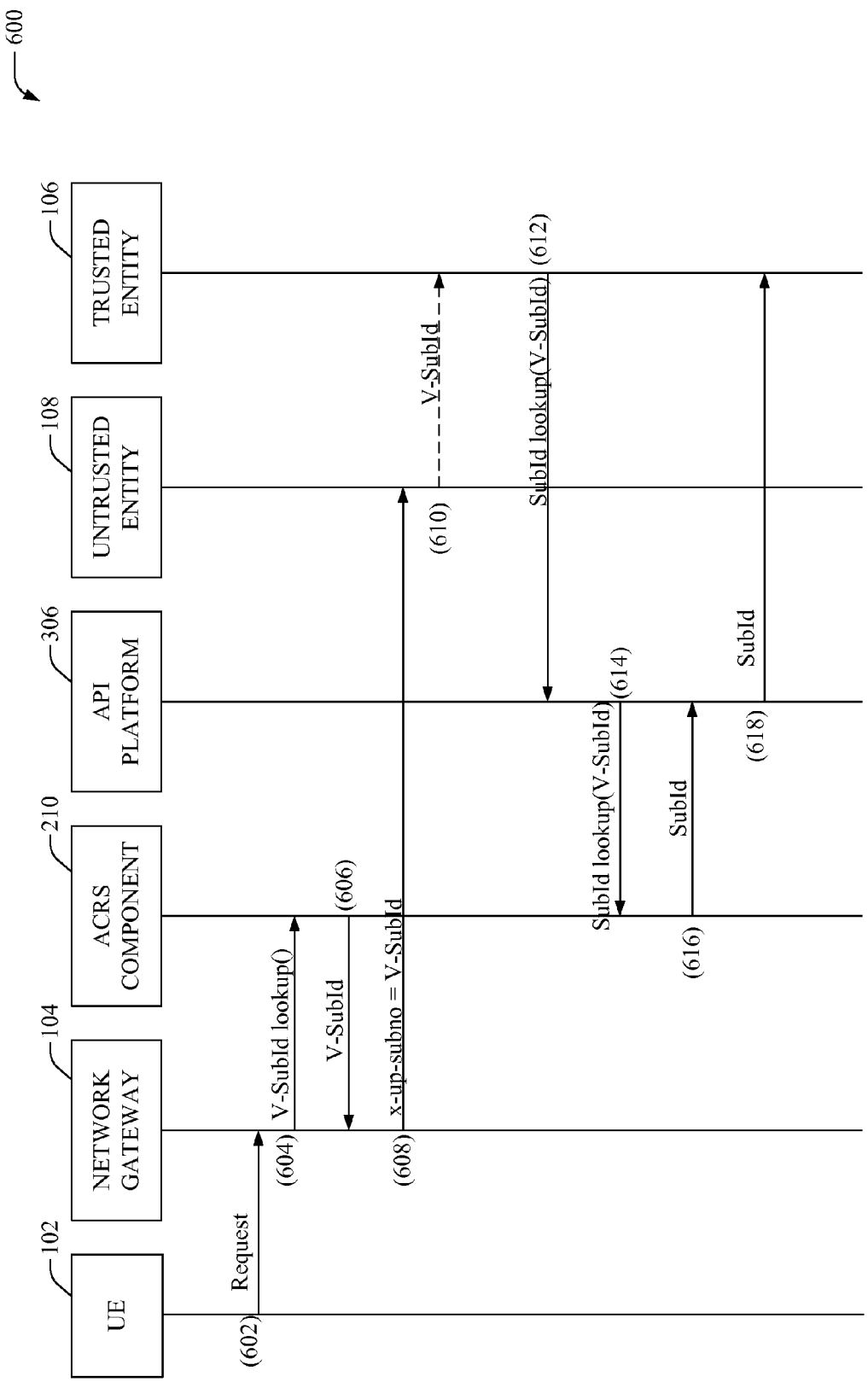
FIG. 6 illustrates an example flow diagram for utilizing a V-SubId to protect user privacy.

FIG. 6 illustrates an example flow diagram 600 for utilizing a V-SubId to protect user privacy, according to an aspect of the disclosed subject matter. Moreover, the UE 102, network gateway 104, trusted entity 106, untrusted entity 108, ACRS component 210, and API platform 306, can include functionality as more fully described herein, for example, as described above with regard to systems 100-500. At 602, the UE 102 can transmit a request to the network gateway 104, for example, via one or more communication network (e.g., cellular network) elements. As an example, the request can include a data packet (e.g., from a browser, app, etc.) to access a website or content provider. In this example scenario, consider that the request is directed towards untrusted entity 108 (that is not authorized to receive the subscriber's SubId). In this regard, at 604, the network gateway 104 can query the ACRS component 210 for a V-SubId. As an example, the network gateway 104 can provide the SubId and/or a destination URL associated with the untrusted entity 108 to the ACRS component 210. In response, the ACRS component 210 performs a table lookup to determine if the given SubId for the given destination URL has been assigned a valid and/or non-expired V-SubId. If not, then the ACRS component 210 generates a new V-SubId and assigns the new V-SubId to the SubId. Moreover, at 606, the V-SubId (e.g., new or previously assigned) is returned to the network gateway 104. In addition, an expiration time associated with the V-SubId can also be transmitted by the ACRS component 210 to the network gateway 104.

Further, the network gateway 104 can insert the V-SubId in an extended HTTP header that provides subscriber identification data, for example, an x-up-subno header). It is to be noted that, "x-up-subno" is one example of a field/gateway parameter inserted within and/or added to an HTTP header in a request/message (e.g., received from UE 102), for example, by a network gateway (e.g., network gateway 104) and that the subject disclosure is not limited to x-up-subno headers. At 608, the network gateway 104 can transmit the x-up-subno header to the untrusted entity 108. In one aspect, the V-SubId can be forwarded, for example, via a set of networked elements/links, from the untrusted entity 108 to a trusted entity 106 (as depicted by dotted line 610). At 612, the trusted entity 106 can transmit a SubId lookup request, with the V-SubId as an input parameter, to the API platform 306. In response, at 614, the API platform 306 can query the ACRS component 210 with the V-SubId. As an example, the ACRS component 210 can perform a reverse lookup to determine the SubId corresponding to the received V-SubId. At 616, the ACRS component 210 can transmit the SubId to the API platform 306, which in turn can forward the SubId to the trusted entity 106, at 618.

Figure 7:
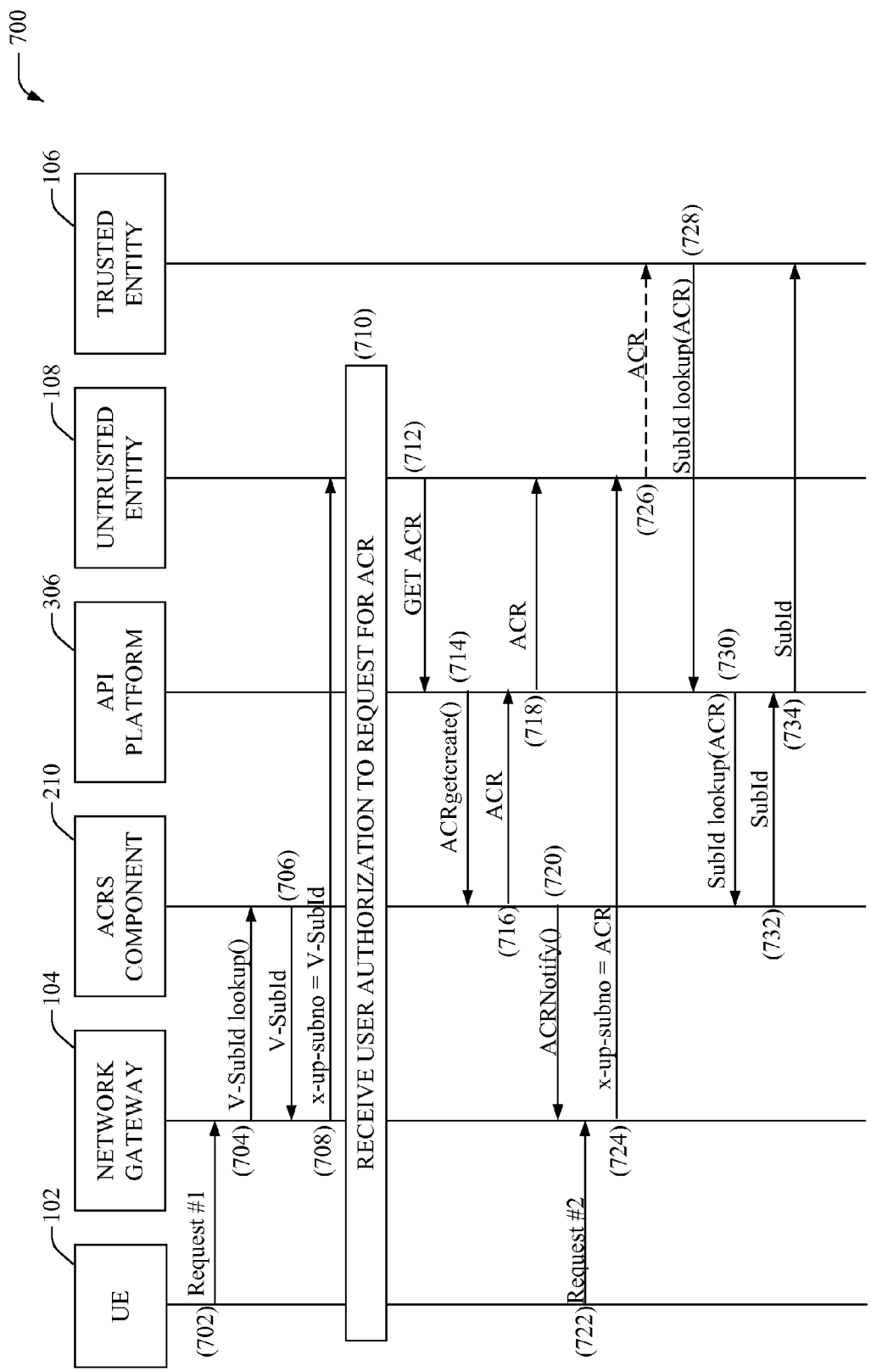
FIG. 7 illustrates an example flow diagram for utilizing a site-specific ACR based on user authorization.

FIG. 7 illustrates an example flow diagram 700 for utilizing a site-specific ACR based on user authorization, according to an aspect of the disclosed subject matter. Moreover, the UE 102, network gateway 104, trusted entity 106, untrusted entity 108, ACRS component 210, and API platform 306, can include functionality as more fully described herein, for example, as described above with regard to systems 100-500. At 702, the UE 102 can transmit a first request (e.g., directed towards untrusted entity 108) to the network gateway 104, for example, via one or more communication network elements. At 704, the network gateway 104 can query the ACRS component 210 for a V-SubId. As an example, the network gateway 104 can provide the SubId and/or a destination URL associated with the untrusted entity 108 to the ACRS component 210. In response, the ACRS component 210 performs a table lookup to determine if the given SubId for the given destination URL has been assigned a valid and/or non-expired V-SubId. If not, then the ACRS component 210 can generate a new V-SubId and assign the new V-SubId to the SubId. Moreover, at 706, the V-SubId (e.g., new or previously assigned) can be returned to the network gateway 104. In addition, an expiration time associated with the V-SubId can also be transmitted by the ACRS component 210 to the network gateway 104. At 708, the network gateway 104 can transmit the request to the untrusted entity 108 with the V-SubId inserted within the x-up-subno header of the request.

In one aspect, the untrusted entity 108 can exchange the V-SubId for a static ACR based on user authorization. At 710, the untrusted entity 108 can facilitate user authorization (e.g., via an authorization server associated with the service provider) to make a request for an ACR. For example, the untrusted entity 108, via a web browser displayed on UE 102, can query whether the user would like the untrusted entity 108 to remember preferences and/or credentials associated with the user and/or UE 102. If the user provides a positive acknowledgment, an authorization token can be provided (e.g., via the authorization server) to the untrusted entity 108, which in turn can utilize the authorization token to facilitate receipt of the ACR. Moreover, on receiving user authorization, at 712 the untrusted entity 108 can transmit a GET ACR command to the API platform 306 (e.g., including transmitting the authorization token to the API platform 306).

On receiving verifying user authorization based on the authorization token, at 714, the API platform 306 can transmit an ACRgetcreate( ) query to the ACRS component 210. ACRgetcreate( ) is a routine/function called by the API platform 306 to retrieve an ACR from the ACRS component 210. As an example, the ACRgetcreate( ) can include input parameters, such as V-SubId (e.g., provided by the untrusted entity 108) and/or SubId (e.g., provided by the API platform 306) and a uniform resource identifier (URI) (e.g., provided by the API platform 306 as registered by the untrusted entity 108 at on-boarding). In response, the ACRS component 210 can generate the ACR for the untrusted entity 108, and at 716 and 718, the ACR can be transmitted to the untrusted entity 108 via the API platform 306. In addition, at 720, the ACRS component 210 can notify the network gateway 104 of the newly generated ACR for the untrusted entity 108. As an example, the notification allows a dynamic update of the network gateway 104 with the authorized ACR for a given URL. In one embodiment, at 722, a second request (e.g., directed to the untrusted entity 108) is transmitted by UE 102. Moreover, the network gateway 104 can utilize the ACR (e.g., received at 720), for example, insert the ACR in the x-up-subno header of the request, and at 724, the network gateway 104 can transmit the x-up-subno header to the untrusted entity 108. As an example, the ACR can be transmitted in the x-up-subno header of all subsequent requests between the UE 102 and the untrusted entity 108, until the ACR is deleted (e.g. based on user authorization).

In one aspect, the ACR can be forwarded, for example, via a set of networked elements/links, from the untrusted entity 108 to a trusted entity 106 (as depicted by dotted line 726). At 728, the trusted entity 106 can transmit a SubId lookup request, with the ACR as an input parameter, to the API platform 306. In response, at 730, the API platform 306 can query the ACRS component 210 with the ACR, which in turn can perform a reverse lookup to determine the SubId corresponding to the received ACR. At 732, the ACRS component 210 can transmit the SubId to the API platform 306, and at 734, the API platform 306 can forward the SubId to the trusted entity 106.

Figure 8:
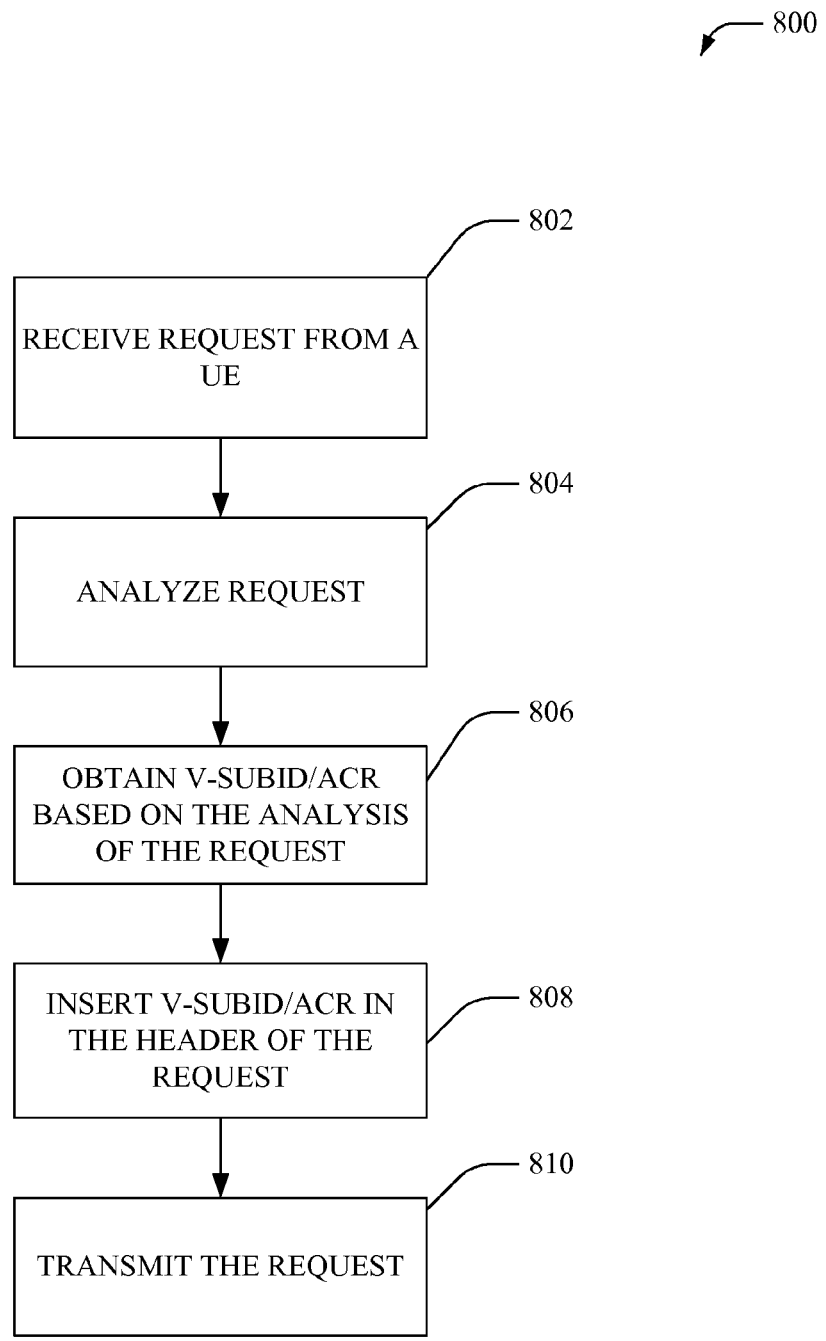
FIG. 8 illustrates an example methodology that facilitates request enrichment with V-SubIds or ACRs.

Referring now to FIG. 8, illustrated is an example methodology 800 that facilitates request enrichment with V-SubIds and/or ACRs, according to an aspect of the subject disclosure. Typically, methodology 800 can be implemented to avoid and/or prevent tracking of subscriber activity by unauthorized entities. At 802, a request (e.g., data packet) can be received from a UE (e.g., by network gateway 104). At 804, the request can be analyzed (e.g., by request analysis component 202). As an example, it can be determined, based on the analysis, that the request is directed to an untrusted/unauthorized entity (e.g., website, system, network server, etc.). At 806, a V-SubId or ACR can be obtained for the request, for example, based on the analysis (e.g., by request enrichment component 208). As an example, the V-SubId or ACR can be determined and/or assigned to a URL associated with the untrusted/unauthorized entity. At 808, the V-SubId or ACR can be inserted in the header of the request (e.g., by request enrichment component 208). Further, at 810, the request, with the modified header, can be transmitted, for example, to the untrusted/unauthorized entity.

Figure 9:
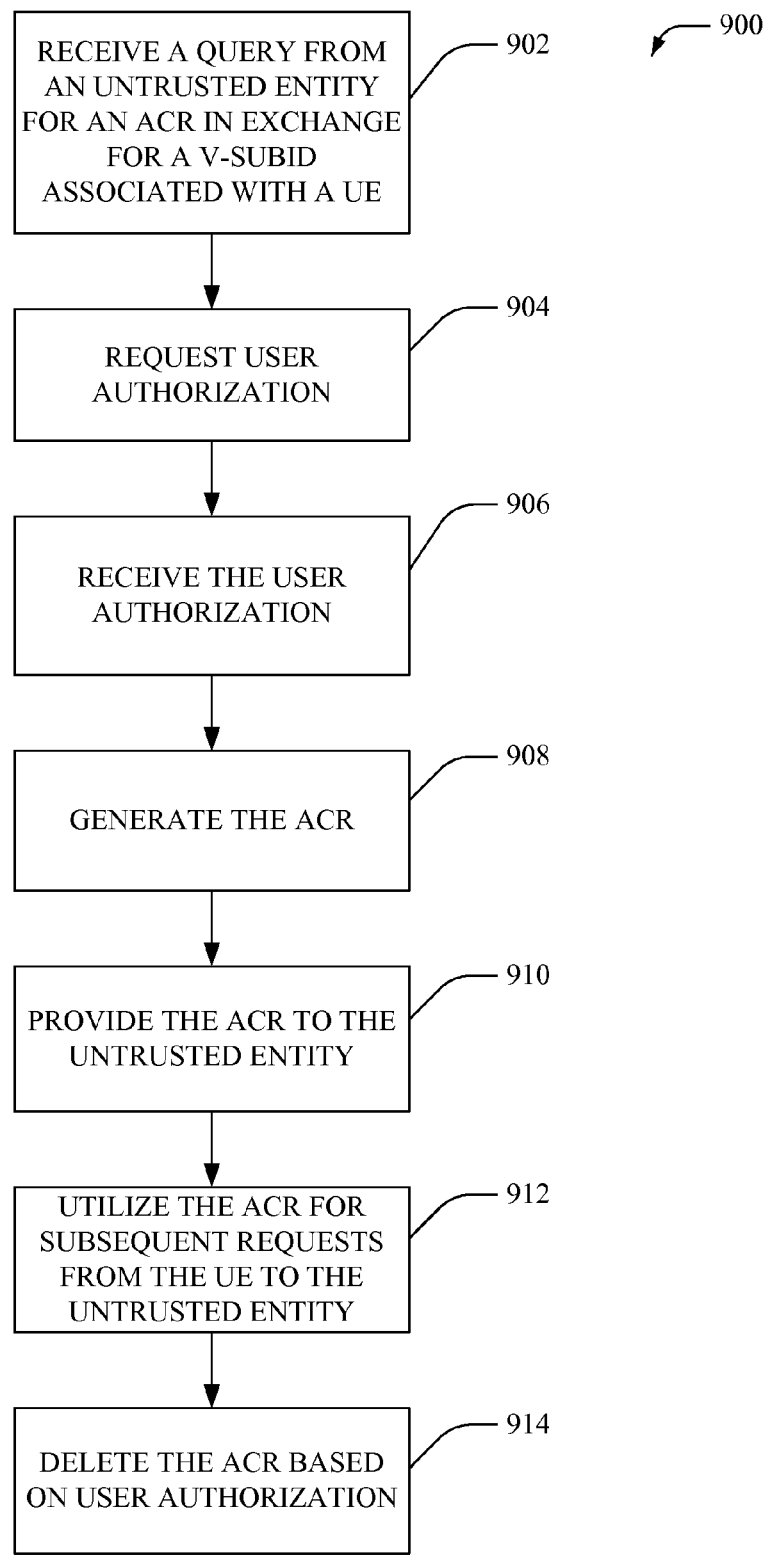
FIG. 9 illustrates an example methodology that facilitates ACR management in accordance with an aspect of the disclosed subject matter.

FIG. 9 illustrates an example methodology 900 that facilitates ACR management in accordance with an aspect of the disclosed subject matter. At 902, a query can be received from an untrusted entity to exchange a V-SubId associated with a UE for an ACR (e.g., by the API platform 306). At 904, user authorization can be requested (e.g., by the API platform 306). Further at 906, user authorization can be received (e.g., by the API platform 306), for example, via a UE. At 908, an ACR can be generated (e.g., by the ACRS component 210). As an example, an expiry time associated with the ACR can indicate that the ACR is not to be changed unless approved by the user. Further, at 910, the ACR can be provided to the untrusted entity (e.g., by the API platform 306).

Moreover, at 912, the ACR can be utilized for subsequent requests received from the UE that are directed to the untrusted entity. For example, the ACR can be inserted within a header of the subsequent requests and the enriched requests can be forwarded to the untrusted entity. In one aspect, at 914, the ACR can be deleted based on user authorization. As an example, the deletion of the ACR can be requested by the user and/or the untrusted entity (and authorized by the user). Once the ACR is deleted, subsequent requests can be enriched with V-SubIds that are modified per session and/or periodically.

Figure 10:
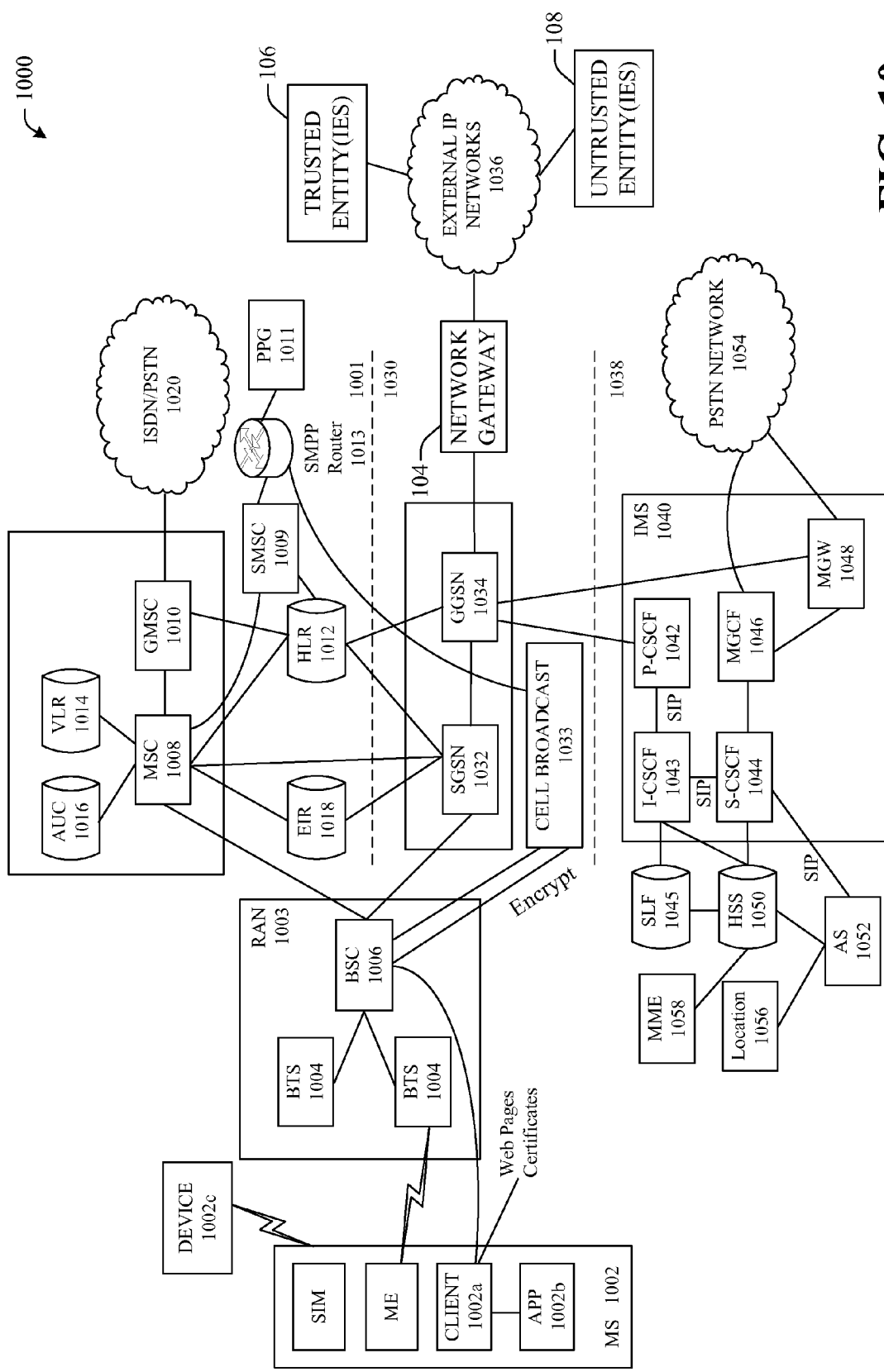
FIG. 10 illustrates a Global System for Mobile Communications (GSM)/General Packet Radio Service (GPRS)/Internet protocol (IP) multimedia network architecture that can employ the disclosed architecture.

Now turning to FIG. 10, there is depicted an example GSM/GPRS/IP multimedia network architecture 1000 that can employ the disclosed communication architecture. In particular, the GSM/GPRS/IP multimedia network architecture 1000 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 1002 includes an embedded client 1002a that receives and processes messages received by the MS 1002. The embedded client 1002a can be implemented in JAVA and is discuss more fully below. It can be appreciated that MS 1002 can be substantially similar to UE 102 and include functionality described with respect to UE 102 in systems 200-500.

The embedded client 1002a communicates with an application 1002b that provides services and/or information to an end user. Additionally or alternately, the MS 1002 and a device 1002c can be enabled to communicate via a short-range wireless communication link, such as BLUETOOTH®. As one of ordinary skill in the art would recognize, there can be an endless number of devices 1002c that use the SIM within the MS 1002 to provide services, information, data, audio, video, etc. to end users.

The BTS 1004 is physical equipment, such as a radio tower, that enables a radio interface to communicate with the MS 1002. Each BTS can serve more than one MS. The BSC 1006 manages radio resources, including the BTS. The BSC 1006 can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment. In one aspect, the AuC 1016 performs a SIM authentication, in response to MS 102, for example, powering-on and/or entering a coverage area of the BTS 1004. The SIM authentication allows the MS 1002 to communicate via the GSM/GPRS/IP multimedia network.

By way of example, on authentication, a Gateway GPRS Support Node (GGSN) 1034, can assign an Internet protocol (IP) address to the MS 1002, receive a device number, such as, but not limited to, a MSISDN associated with the MS 1002 from the HLR 1012, and propagate the IP address and corresponding MSISDN to downstream network elements such as the network gateway 104.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS 1002 first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations, security functions, and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS 1002 through the SGSN 1032. In one aspect, the GGSN 1034 is coupled to the other IP networks 1036 via the network gateway 104. Moreover, network gateway 104 can be coupled to the ACRS component 210 (not shown) and can include functionality as more fully described herein, for example, as described above with regard to systems 100-500. In addition, in one aspect, trusted entities 106 and untrusted entities 108 can include (but are not limited to) most any network server (e.g., web server, application server, email server, etc.) and can include functionality as more fully described herein, for example, as described above with regard to systems 100-500. Although it is depicted in FIG. 10 as residing outside the GGSN 1034, the network gateway 104 can reside within (e.g., completely or partially) the GGSN 1034. When packet-switched data leaves the GPRS network, it is transferred to an external TCP-IP network 1036, such as an X.25 network or the Internet. In order to access GPRS services, the MS 1002 first attaches itself to the GPRS network by performing an attach procedure. The MS 1002 then activates a packet data protocol (PDP) context, thus activating a packet communication session between the MS 1002, the SGSN 1032, and the GGSN 1034. In a GSM/GPRS network, GPRS services and GSM services can be used in parallel. A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002. The MME 1058 provides authentication of a user by interacting with the HSS 1050 in LTE networks.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with a PSTN network 1054 for TDM trunks. In addition, the MGCF 1046 communicates with the PSTN network 1054 for SS7 links. According to an embodiment, system 100-500 disclosed herein can be implemented within and/or communicatively coupled to the GSM network 1001, the GPRS network 1030, the IP multimedia network 1038, and/or the IP networks 1036.

Figure 11:
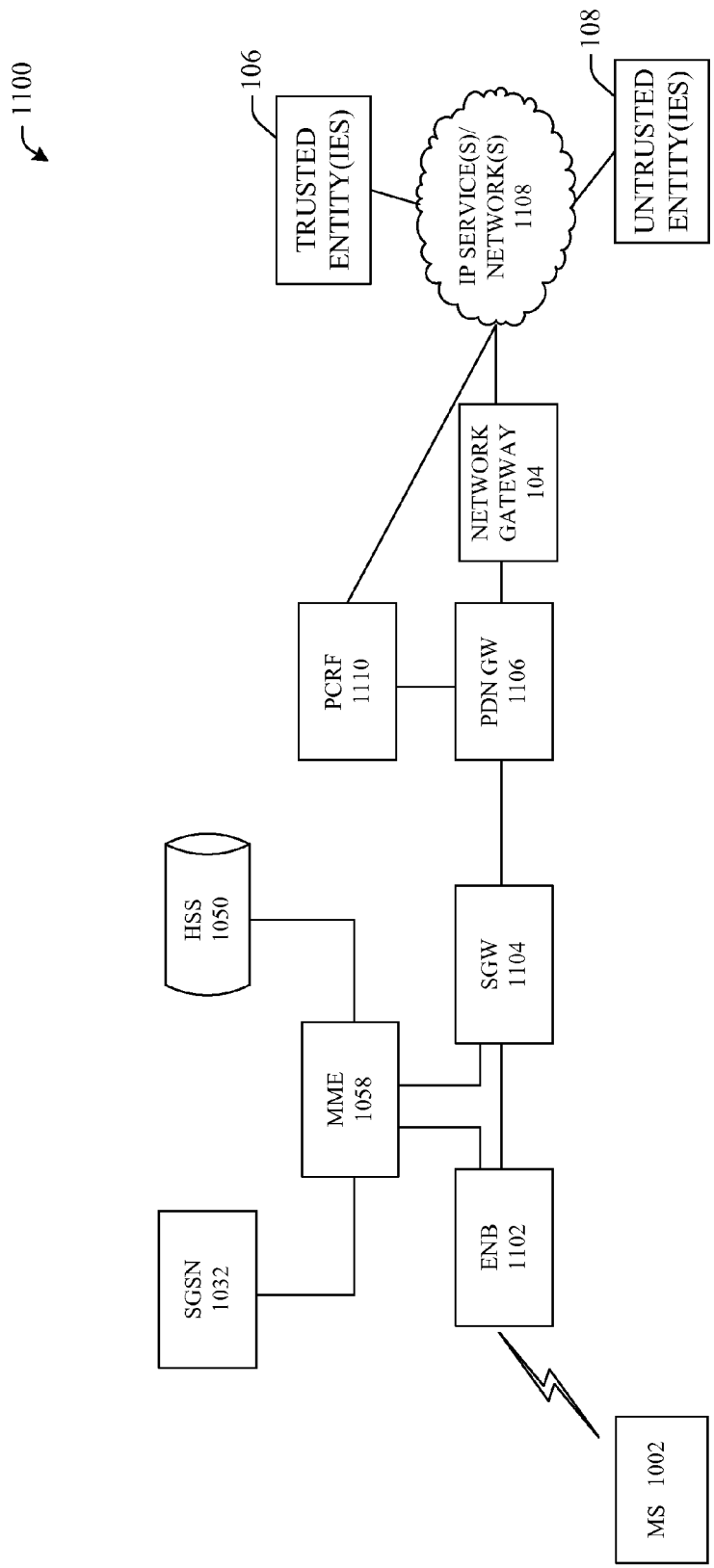
FIG. 11 illustrates a Long Term Evolution (LTE) network architecture that can employ the disclosed architecture.

FIG. 11 illustrates a high-level block diagram that depicts an example LTE network architecture 1100 that can employ the disclosed communication architecture. MS 1002, SGSN 1032, HSS 1050, MME 1058, network gateway 104, trusted entity(ies) 106, and untrusted entity(ies) 108 can include functionality as more fully described herein, for example, as described above with regard to systems 100-500 and 1000.

The evolved RAN for LTE consists of an eNodeB (eNB) 1102 that can facilitate connection of MS 1002 to an evolved packet core (EPC) network. The connection of the MS 1002 to the evolved packet core (EPC) network is subsequent to an authentication, for example, a SIM-based authentication between the MS 1002 and the evolved packet core (EPC) network. As an example, the eNB 1102 can host a PHYsical (PHY), Medium Access Control (MAC), Radio Link Control (RLC), and Packet Data Control Protocol (PDCP) layers that include the functionality of user-plane header-compression and encryption. In addition, the eNB 1102 can implement at least in part Radio Resource Control (RRC) functionality (e.g., radio resource management, admission control, scheduling, cell information broadcast, etc.). The eNB 1102 can be coupled to a serving gateway (SGW) 1104 that facilitates routing of user data packets and serves as a local mobility anchor for data bearers when the MS 1002 moves between eNBs. In addition, the SGW 1104 can act as an anchor for mobility between LTE and other 3GPP technologies (GPRS, UMTS, etc.). When MS 1002 is in an idle state, the SGW 1104 terminates a downlink (DL) data path and triggers paging when DL data arrives for the MS 1002. Further, the SGW 1104 can perform various administrative functions in the visited network such as collecting information for charging and lawful interception.

In one aspect, the SGW 1104 can be coupled to a Packet Data Network Gateway (PDN GW) 1106 that provides connectivity between the MS 1002 and external packet data networks such as IP service(s)/network(s) 1108. Moreover, the PDN GW 1106 is a point of exit and entry of traffic for the MS 1002. It can be noted that the MS 1002 can have simultaneous connectivity with more than one PDN GW (not shown) for accessing multiple PDNs.

The PDN GW 1106 performs IP address allocation for the MS 1002, as well as QoS enforcement and implements flow-based charging according to rules from a Policy Control and Charging Rules Function (PCRF) 1110. The PCRF 1110 can facilitate policy control decision-making and control flow-based charging functionalities in a Policy Control Enforcement Function (PCEF), which resides in the PDN GW 1106. The PCRF 1110 can store data (e.g., QoS class identifier and/or bit rates) that facilitates QoS authorization of data flows within the PCEF.

In one aspect, the PDN GW 1106 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1X and EvDO).

In one aspect, the PDN GW 1106 is coupled to the IP service(s)/network(s) 1108 via the network gateway 104. The network gateway 104 can be coupled to the ACRS component 210 (not shown) and can include functionality as more fully described herein, for example, as described above with regard to systems 100-500. In addition, in one aspect, trusted entities 106 and untrusted entities 108 can include (but are not limited to) most any network server (e.g., web server, application server, email server, etc.) and can include functionality as more fully described herein, for example, as described above with regard to systems 100-500. Although it is depicted in FIG. 11 as residing outside the PDN GW 1106, the network gateway 104 can reside within (e.g., completely or partially) the PDN GW 1106.

Although the GSM/GPRS/IP multimedia network architecture 1000 and LTE network architecture 1100 is described and illustrated herein, it is noted that most any communication network architecture can be utilized to implement the disclosed embodiments.

Figure 12:
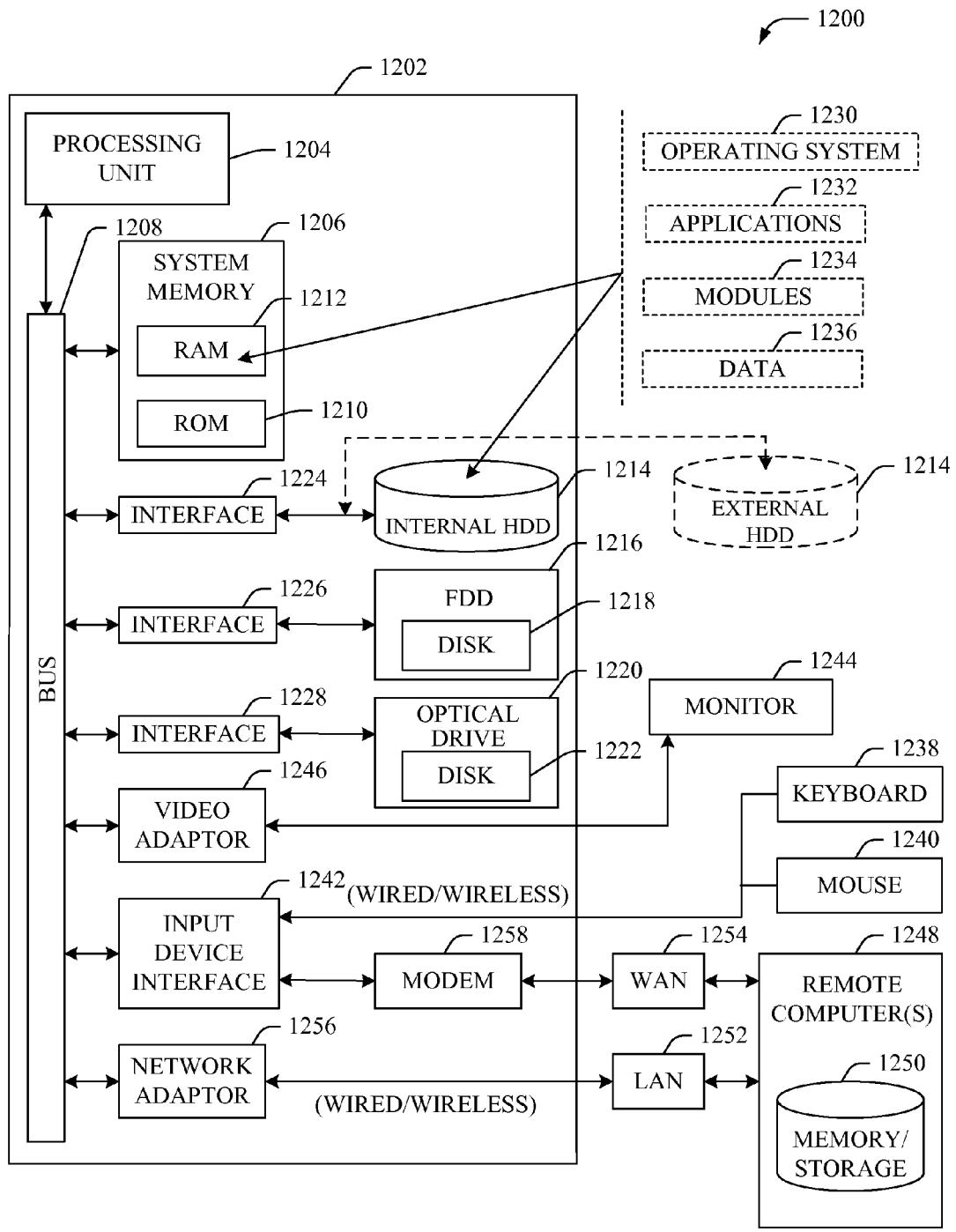
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the gateway(s), entity(ies), component(s), and platform(s) (e.g., network gateway 104, trusted entity(ies) 106, untrusted entity(ies) 108, ACRS component, API platform 306, etc.) disclosed herein with respect to system 100-500 can each include at least a portion of the computer 1202. In another example, a combination of the gateway(s), entity(ies), component(s), and/or platform(s) can each include one or more computers such as, or substantially similar to, computer 1202. Further, each of the network element(s) (stand alone and/or in combination with one or more other network elements) disclosed herein with respect to systems 1000 and 1100 can include at least a portion of computer 1202, or can include one or more computers such as, or substantially similar to, computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store executable instructions;
a processor, coupled to the memory, that facilitates execution of the executable instructions to perform operations, comprising:
facilitating an authentication of a user equipment to allow the user equipment to connect with a set of devices of a cellular network, wherein the authentication is based on static identifier data indicative of a static identifier associated with a subscriber account related to the user equipment,
receiving, from the user equipment via a subset of the set of devices, request data indicative of a request for an operation to be performed by a device that is accessible via the cellular network, and
in response to determining that the device is an untrusted device, inserting variable subscriber identifier data indicative of a variable subscriber identifier within the request data into the request data prior to facilitating a transmission of the request data to the device, wherein the variable subscriber identifier data is selected based on the authentication.

2. The system of claim 1, wherein the inserting comprises inserting the variable subscriber identifier data within a header of the request data.

3. The system of claim 1, wherein a value of the variable subscriber identifier is modified in response to an expiration criterion being determined to be satisfied.

4. The system of claim 1, wherein the operations further comprise: receiving, from a trusted device, query data indicative of a query that comprises the variable subscriber identifier data.

5. The system of claim 4, wherein the operations further comprise:
in response to a verification that the trusted device is authorized to access the static identifier data, directing, to the trusted device, the static identifier data that corresponds to the variable subscriber identifier data.

6. The system of claim 1, wherein the operations further comprise:
receiving, from the device, query data that comprises the variable subscriber identifier.

7. The system of claim 6, wherein the operations further comprise:

in response to determining that authorization data is received via the user equipment, determining anonymous customer reference data comprising an anonymous customer reference value that corresponds to the variable subscriber identifier and is assigned to the device, wherein the anonymous customer reference value does not change for a defined time period.

8. The system of claim 7, wherein the operations further comprise: directing the anonymous customer reference data to the device.

9. The system of claim 7, wherein the operation is a first operation, the request data is first request data, and the operations further comprise:
receiving, from the user equipment, second request data indicative of a subsequent request for a second operation to be performed by the device,
inserting the anonymous customer reference data within the second request data, and
directing, to the device, the second request comprising the anonymous customer reference data.

10. The system of claim 9, wherein the query data is first query data, the query is a first query and the operations further comprise:
receiving, from a trusted device, second query data indicative of a second query that comprises the anonymous customer reference, and
in response to a verification that the trusted device is authorized to access the static identifier directing, to the trusted device, the static identifier data that corresponds to the anonymous customer reference.

11. The system of claim 1, wherein the static identifier is associated with a subscriber identity module of the user equipment.

12. The system of claim 1, wherein the determining that the device is the untrusted device comprises determining that the device is the untrusted device based on uniform resource location data received from a data store of the cellular network.

13. A method, comprising:
receiving, by a gateway device of a cellular network that comprises a processor, query data indicative of a query for a variable subscriber identifier that is to be inserted into a request from a user equipment, the request being directed to an untrusted device;
determining, by the gateway device, static identifier data associated with a subscriber account of the user equipment;
based on an authorization of the user equipment with a network device of the cellular network determining, by the gateway device, variable subscriber identifier data indicative of the variable subscriber identifier; and
assigning, by the gateway device, the variable subscriber data identifier to the static identifier data.

14. The method of claim 13, further comprising:
determining, by the gateway device, an expiration criterion associated with the variable subscriber identifier data; and
in response to determining that the expiration criterion is satisfied, modifying, by the gateway device, the variable subscriber identifier data.

15. The method of claim 13, further comprising:
inserting, by the gateway device, the variable subscriber identifier in the query data; and
subsequent to the inserting, facilitating, by the gateway device, a transmission of the request to the untrusted device.

16. The method of claim 15, wherein the query data is first query data, the query is a first query, the transmission is a first transmission, and the method further comprises:
receiving, by the gateway device, second query data indicative of a second query from the untrusted device, wherein the second query data comprises the variable subscriber identifier;
in response to receiving authorization data, determining, by the gateway device, anonymous customer reference data indicative of an anonymous customer reference value that is to be inserted in a subsequent request from the user equipment to the untrusted device; and
facilitating, by the gateway device, a second transmission of the anonymous customer reference to the untrusted device.

17. The method of claim 16, wherein the authorization data is first authorization data and the method further comprises:
deleting, by the gateway device, the anonymous customer reference data based on receiving second authorization data.

18. The method of claim 13, wherein the determining the static identifier data comprises determining the static identifier data based on the authorization that utilizes information from a subscriber identity module of the user equipment to grant the user equipment access to the cellular network.

19. The method of claim 13, wherein the query data is a first query data, the query is a first query, the transmission is a first transmission, and the method further comprises:
receiving, by the gateway device, second query data indicative of a second query that comprises the variable subscriber identifier, wherein the receiving the second query data comprises receiving the second query data from a trusted device; and
in response to determining that the trusted device is authorized to access the static identifier, facilitating, by the gateway device, a second transmission of the static identifier data to the trusted device.

20. A computer-readable storage device comprising executable instructions that, in response to execution, cause a gateway device of a cellular network that comprises a processor, to perform operations comprising:
based on analyzing request data indicative of a request received from a user equipment, determining that the request is directed to an untrusted device accessible via the cellular network, the request being for an operation to be performed by the untrusted device;
determining static identifier data indicative of a static identifier relating to a subscriber account associated with the user equipment;
based on an authorization of the user equipment with a set of network devices of the cellular network, determining variable subscriber identifier data indicative of a variable subscriber identifier that is to be assigned to the static identifier data; and
directing, to the untrusted entity, the request data with the variable subscriber identifier data.

21. The computer-readable storage device of claim 20, wherein the variable subscriber identifier data is modified in response to an expiration criterion being determined to be met.

22. The computer-readable storage device of claim 20, wherein the static identifier data is associated with information stored within a subscriber identity module of the user equipment.

23. The computer-readable storage device of claim 20, wherein the request data is first request data, the request is a first request, and the operations further comprise:

based on analyzing second request data indicative of a second request received from the user equipment, determining that the second request is directed to a trusted device accessible via the cellular network, the second request being for a second operation to be performed by the trusted device;

in response to the determining that the second request is directed to the trusted device, inserting the static identifier data into the second request; and directing, to the trusted device, the second request data with the inserted static identifier data.

24. The computer-readable storage device of claim 20, wherein the operations further comprise:

receiving anonymous customer reference indicative of an anonymous customer reference that is assigned to the static identifier associated with the user equipment for a predefined time period, wherein the anonymous customer reference is specific to the untrusted device and is generated based on authorization data received via the user equipment.

25. The computer-readable storage device of claim 24, wherein the operations further comprise:

during the predefined time period, inserting the anonymous customer reference data into subsequent request data indicative of a subsequent request that is directed to the untrusted device, the subsequent request being for another operation to be performed by the untrusted device entity; and directing the subsequent request data with the inserted anonymous customer reference data to the untrusted entity.

* * * * *